United States Patent
Zhou et al.

(10) Patent No.: US 9,325,423 B1
(45) Date of Patent: Apr. 26, 2016

(54) SYSTEMS AND METHODS FOR COMPLEMENTARY SIGNAL TRANSMISSION

(71) Applicant: Google Inc., Mountain View, CA (US)

(72) Inventors: Xiang Zhou, Los Altos, CA (US); Ryohei Urata, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/447,156

(22) Filed: Jul. 30, 2014

Related U.S. Application Data (60) Provisional application No. 61/991,879, filed on May 12, 2014.

(51) Int. Cl.
*H04B 10/532* (2013.01)
*H04B 10/61* (2013.01)
*H04J 14/06* (2006.01)

(52) U.S. Cl.
CPC .......... *H04B 10/6162* (2013.01); *H04B 10/532* (2013.01); *H04J 14/06* (2013.01)

(58) Field of Classification Search
CPC ............................. H04B 10/532; H04B 14/06
See application file for complete search history.

(56) References Cited

U.S. PATENT DOCUMENTS

| | | | |
|---|---|---|---|
| 5,105,293 A | 4/1992 | Bortolini | |
| 5,253,309 A * | 10/1993 | Nazarathy | H04B 10/25 385/1 |
| 6,580,535 B1 | 6/2003 | Schonfelder | |
| 8,224,188 B2 | 7/2012 | Devgan et al. | |
| 2014/0050235 A1* | 2/2014 | Clowes | G02F 1/365 372/6 |

FOREIGN PATENT DOCUMENTS

EP      0 403 991 A2    12/1990
WO    WO-2013/177012 A1    11/2013

OTHER PUBLICATIONS

Roudas, I., et al., Differential signlaing for low optical energy consumption in datacom optical interconnects, Optical Interconnects Conference, IEEE, pp. 118-119, May 2013.

* cited by examiner

*Primary Examiner* — Nathan Curs
(74) *Attorney, Agent, or Firm* — Foley & Lardner LLP; Edward A. Gordon (57) ABSTRACT

This disclosure provides systems, methods, and apparatus for improving a signal-to-noise ratio of a signal transmitted over a communication link. The communication system can include a transmitter, a receiver and a communication link for communicating data between the transmitter and the receiver. In some implementations, the transmitter employs a modulator for generating a modulated data signal and a complementary modulated data signal and send over the fiber link through two orthogonal polarizations. The receiver utilizes both the modulated data signal and the complementary modulated data signal for regenerating the transmitted data at the receiver. In some implementations, the receiver determines and transmits a polarization parameter to the transmitter, which adjusts the polarizations of the transmitted modulated and complementary modulated data signals to compensate for polarization angle rotation introduced by the communication link.

8 Claims, 4 Drawing Sheets

SYSTEMS AND METHODS FOR COMPLEMENTARY SIGNAL TRANSMISSION

CROSS REFERENCE TO RELATED PATENT APPLICATIONS

This application claims priority to U.S. Provisional Patent Application Ser. No. 61/991,879, filed May 12, 2014, which is incorporated by reference herein in its entirety.

TECHNICAL FIELD

This disclosure relates to the field of communication networks, and in particular to communication transceivers.

DESCRIPTION OF THE RELATED TECHNOLOGY

Communication systems, such as optical communication systems, include transmitters and receivers for communicating data over communication links. High bandwidth data transmission communication systems typically employ higher order modulation techniques for transmitting data to the receiver. The communication link may introduce noise and other undesirable artifacts in the data transmitted between the transmitter and the receiver.

SUMMARY

According to one aspect, the subject matter described in this disclosure relates to an optical communication system including an optical transmitter communicably coupled to an optical link and an optical receiver communicably coupled to the optical link. The optical transmitter includes an optical signal generator configured to generate an optical signal, an electro-optic modulator, having an input port coupled to the optical signal generator, a first output port, and a second output port, the electro-optic modulator configured to modulate the optical signal with an electrical data signal representative of data to be transmitted and generate a modulated optical signal at the first output port and a complementary modulated optical signal at the second output port, at least one polarizer for polarizing the modulated optical signal and the complementary modulated optical signal, the modulated optical signal having a polarization that is orthogonal in relation to the polarization of the complementary modulated optical signal, and, a polarized beam combiner configured to combine the modulated optical signal and the complementary modulated optical signal into a combined optical signal with the modulated optical signal and the complementary modulated optical signal being carried in two orthogonal polarizations for transmission over the optical link. The optical receiver includes a beam splitter communicably coupled to the optical link configured to split the received combined optical signal into a received modulated optical signal and a received complementary modulated optical signal, a pair of photodetectors configured to generate a first electrical signal and a second electrical signal in response to receiving the received modulated optical signal and the received complementary modulated optical signal, and circuitry configured to process the first electrical signal and the second electrical signal to generate a received data signal.

According to another aspect, the subject matter described in this disclosure relates to a method for communicating data over communication system including an optical transmitter and an optical receiver communicating over a communication link. The method includes generating an optical signal, receiving an electrical data signal representative of data to be transmitted by the transmitter, modulating the optical signal with the electrical data signal using an electro-optic modulator to generate a modulated optical signal and a complementary modulated optical signal, transmitting the modulated optical signal and the complementary optical signal to the receiver over the optical link over two orthogonal polarization states, converting, at the receiver, the received modulated optical signal and the received complementary optical signal into a first electrical signal and a second electrical signal, respectively, and processing the first electrical signals and the second electrical signal to generate data.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
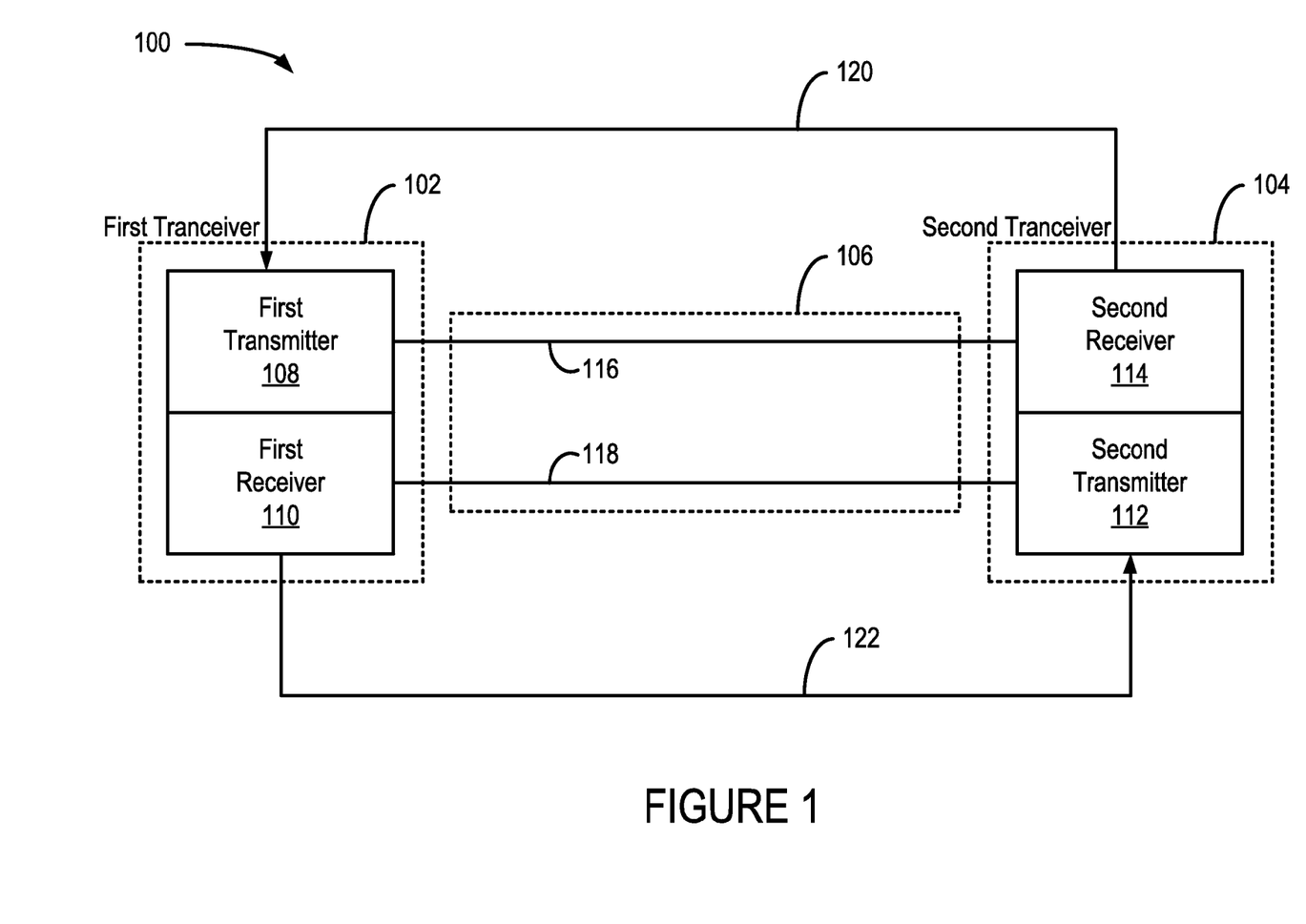
FIG. 1 shows an example communication system.

FIG. 1 shows an example communication system 100. In particular, the communication system 100 includes a first transceiver 102 communicating with a second transceiver 104 over a communication link 106. Each of the first transceiver 102 and the second transceiver 104 can be coupled to their respective devices such as, network switches, computers, data-storage devices, network interface cards, host-bus adapters, etc. The first and the second transceivers 102 and 104 can provide communication between their respective devices. In some implementations, the communication link 106 can include wired or wireless communication links. In some implementations, the communication link 106 can include optical links.

The first transceiver 102 can include a first transmitter 108 and a first receiver 110. Similarly, the second transceiver 104 can include a second transmitter 112 and a second receiver 114. The first transmitter 108 can communicate with the second receiver 114 over a first communication link 116, while the second transmitter 112 can communicate with the first receiver 110 over a second communication link 118. In some implementations, the first transceiver 102 and the second transceiver 104 can communicate over out-of-band links. For example, the second receiver 114 can communicate with the first transmitter 108 over a first out-of-band communication link 120. Likewise, the first receiver 110 can communicate with the second transmitter 112 over a second out-of-band communication link 122. In some implementations, the first and the second out-of-band communication links 120 and 122 can be utilized to communicate management data associated with the communication system 100.

In some implementations, the communication link 106 can be an optical communication link. For example, the first communication link 116 and the second communication link 118 can include optical fibers for carrying optical signals. The first transmitter 108 and the second transmitter 112 can each include circuitry for transmitting optical signals representative of the data being transmitted over the communication links 116 and 118 respectively. Similarly, the first receiver 110 and the second receiver 114 can include circuitry for receiving and processing the optical signals transmitted by the first transmitter 108 and the second transmitter 112, respectively, to generate the data.

In some implementations, the optical signals over the transmission link 106 may be undesirably altered by noise and multi-path interference (MPI). The undesirable effects of noise and MPI can be particularly pronounced for a long transmission link 106 or for high data rate transmission (around or above 100 Gbps). In some implementations, techniques such as forward error correction (FEC) codes can be employed to improve detection and correction of errors at the receiver caused due to noise. However, employing FEC codes may result in an increase in the power consumption and the latency of the communication system 100. Further, in some implementations, FEC codes may be less effective in overcoming undesirable effects of MPI. As discussed below, transmitting the optical signal and its complementary optical signal, where the signals are orthogonally polarized with relation to each other, can provide an improvement in the signal-to-noise ratio (SNR) of the optical signal received at the receiver. This improvement in the SNR of the optical signal at the receiver may alleviate the need for employing techniques such as FEC codes—resulting in a reduction in the power consumption and latency of the communication system.

Figure 2:
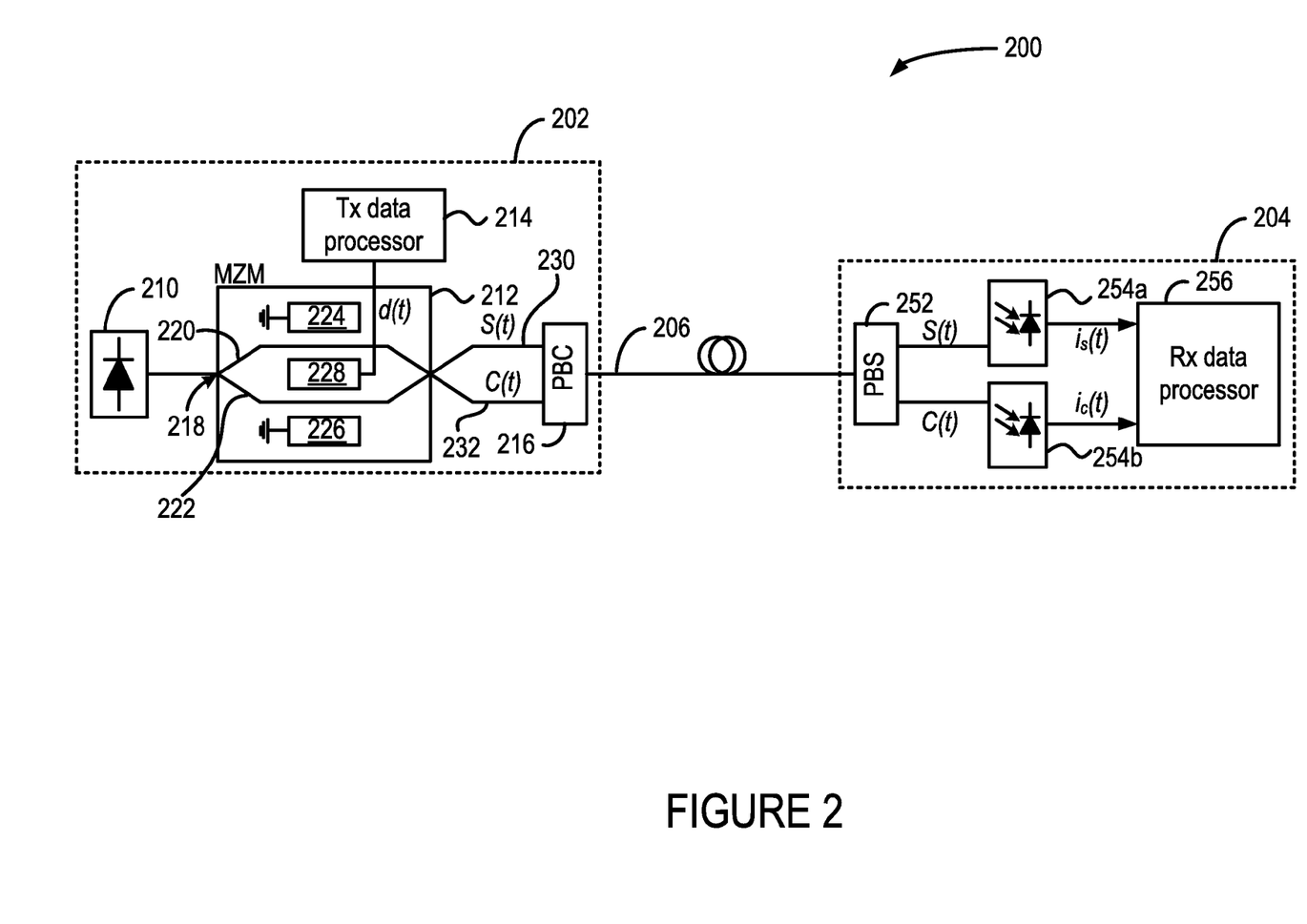
FIG. 2 shows a block diagram of an example communication system.

FIG. 2 shows a block diagram of an example communication system 200. In particular, the communication system includes a transmitter 202 and a receiver 204 communicating over an optical communication link 206. In some implementations, the communication system 200 shown in FIG. 2 can be utilized for implementing the communication system 100 shown in FIG. 1. For example, the transmitter 202 can be utilized for implementing the first transmitter 108 or the second transmitter 112; the receiver 204 can be utilized for implementing the first receiver 110 or the second receiver 114; and the optical communication link 206 can be utilized for implementing the first communication link 116 or the second communication link 118.

The transmitter 202 can include an optical source 210, an optical modulator 212, a transmitter data processor 214, and a polarization beam combiner (PBC) 216. The optical source 210 can generate a continuous wave (CW) optical signal, which can be modulated by the optical modulator 212. The optical source 210 can include light emitting devices such as semiconductor laser diodes, which can include, without limitation, distributed feedback (DFB) laser diodes, separate confinement heterostructure (SCH) laser diodes, vertical-cavity surface-emitting laser (VCSEL) diodes, etc.

The optical modulator 212 can receive and modulate the CW optical signal generated by the optical source 210 at an input port 218. In some implementations, as shown in FIG. 1, the optical modulator 212 can include a Mach-Zehnder modulator (MZM). The optical modulator 212 can split the received optical signals into a first optical path 220 and a second optical path 222. Both the first and the second optical paths 220 and 222 carry the same optical signal received at the input port 218. The first and the second optical paths 220 and 222 can include optical waveguides formed of electro-optic transducer materials, such as, but not limited to, lithium niobate (LiNbO$_3$), gallium arsenide (GaAs), indium phosphide (InP), etc. Electro-optic transducers can, in some implementations, change their refractive index in response to an electrical field. The changes in the refractive index of the transducer can manifest as changes in the phase of the optical signal passing through the transducer. By changing the electrical fields across the first and the second optical paths 220 and 222, the phases of their respective optical signals can be changed.

A first electrode 224, a second electrode 226, and a third electrode 228 are used for generating electrical fields across the first and the second optical paths 220 and 222. The electrical fields generated across the first and the second optical paths 220 and 222 are a function of the data to be transmitted by the transmitter 202. As a result, the change in phases of the optical signals propagating through the first and the second optical paths 220 and 222 can also be a function of the data to be transmitted. In the example configuration shown in FIG. 2, the first and the second electrodes 224 and 226 are connected to ground, while the third electrode 228 is coupled to the transmitter data processor 214. The transmitter data processor 214 generates an electrical signal d(t) that is representative of the data to be transmitted. The resulting electrical fields can change the phase of the optical signal propagating through the first optical path 220 in a direction that is opposite to that of the optical signal propagating through the second optical path 222. The transmitter data processor 214 can include additional circuitry, such as, an error correction encoder, digital-to-analog converters, pre-equalizers, drivers, amplifiers, etc. for generating the electrical signals representative of the data to be transmitted.

A person skilled in the art would appreciate that other configurations of the first, second and the third electrodes 224, 226, and 228 can also be utilized to introduce phase changes in the optical signals propagating through the first and the second optical paths 220 and 222. For example, in some implementations, one of the first and the second electrodes 224 and 226 can be eliminated and the electrical field can be applied across only one of the first and the second optical paths 220 and 222.

The optical signals propagating through first and the second optical paths 220 and 222, having opposing phase changes in relation to the data, can be combined and output through a first output port 230 and a second output port 232. The two optical signals can interfere (constructively and destructively) to generate two amplitude modulated optical signals at the first output port and the second output port 230 and 232, respectively. Specifically, the optical modulator 212 can generate a modulated optical signal S(t) at the first output port 230 and a complementary modulated optical signal C(t) at the second output port 232. In some implementations the complementary modulated optical signal C(t)=A−S(t), where A is a constant light intensity value.

The two complementary output signals S(t) and C(t) can be polarized with orthogonal relative polarizations by introducing one 90 degree polarization rotator to one of the two modulated signals. Such a 90 degree polarization rotator is usually integrated into the polarization beam combiner 216 (PBC). In some implementations, the transmitter 202 can include separate polarizers for rotating the polarization of one or both the complementary modulated signals such that the two complementary modulated signals have orthogonal relative polarizations. In some implementations, the polarization rotators can be implemented using half-wave and quarter-wave plates formed of birefringent materials, such as quartz.

As mentioned above, the optical modulator 212 can be implemented using an MZM for generating the modulated S(t) and the complementary modulated optical signal C(t). In particular, the MZM can be operated in a dual output configuration, in which the MZM can generate the modulated S(t) and the complementary modulated optical signal C(t). In some implementations, other optical modulators such as microring resonators (MRR), Mach Zehnder interferometer (MZI) or any other electro-optic amplitude modulator can be utilized for implementing the optical modulator 212. For example, in some implementations, MZM, MZI or MRR modulators where one of the two output ports, instead of being used for biasing the modulators locally, can be used for generating a complementary modulated optical signal. While the optical modulator 212 described above utilizes electro-optic amplitude modulation, the optical modulator 212 can readily be configured to modulate a different parameter of an optical signal such as phase, frequency, etc. In some implementations, modulators other than electro-optic modulators, such as, without limitation, acousto-optic modulators, magneto-optic modulators, mechano-optic modulators, thermo-optic modulators, or combinations thereof, can be utilized for implementing the optical modulator 212.

The PBC 216 polarizes and combines the orthogonally polarized modulated signal S(t) and the complementary modulated optical signal C(t) onto a single optical fiber, such as the optical communication link 206. For typical implementations, a 90 degree polarization rotator is integrated inside the PBC such that the two inputs to the PBC are allowed to be co-polarized by using typical polarization-maintaining fibers. For example, in some implementations, both the modulated optical signal S(t) and the complementary modulated optical signal C(t) may be linearly polarized with their respective polarizations offset by about 90 degrees (or π/2 radians). In some implementations, alternative polarization multiplexers other than the PBC 216 can be utilized for combining the polarized modulated signal S(t) and complementary modulated optical signal C(t) onto the communication link 206.

The receiver 204 includes a polarization beam splitter (PBS) 252, a pair of balanced photodiodes 254a and 254b and a receiver data processor 256. The PBS 252 can split the orthogonally polarized modulated optical signal S(t) and the complementary modulated optical signal C(t) received over the same optical communication link 206. The received modulated optical signal S(t) and the complementary modulated optical signal C(t) can be provided to a first photodiode 254a and a second photodiode 254b, respectively. In some implementations, the first and the second photodiodes 254a and 254b can include semiconductor photodiodes that generate an electrical signal as a function of the incident optical signal. For example, the first and the second photodiodes 254a and 254b can generate electrical currents $i_s(t)$ and $i_c(t)$, respectively corresponding to the modulated optical signal S(t) and the complementary modulated optical signal C(t), respectively. Specifically, the electrical currents $i_s(t)$ and $i_c(t)$ can be expressed as follows:

$$i_s(t) = \varsigma \cdot S(t) + n_a(t) \quad (1)$$

$$i_c(t) = \varsigma \cdot C(t) + n_b(t) \quad (2)$$

where, ç is a constant representing the net effects of losses over the communication link 106 and the responsivity of the photodiodes 254a and 254b, and $n_a(t)$ and $n_b(t)$ represent the noise signals generated by the photo diodes 254a and 254b, respectively. In some implementations, the receiver data processor 256 can subtract the electrical currents generated by the two photodiodes 254a and 254b to generate a resultant electrical current i(t) representative of the transmitted data. For example, in some implementations, the receiver data processor 256 can process the received electrical currents utilizing a pair of balanced photodetectors as follows:

$$i(t) = i_s(t) - i_c(t) \quad (3)$$

$$i(t) = \varsigma(S(t) - C(t)) + n_a(t) + n_b \quad (4)$$

As discussed above, the complementary modulated optical signal C(t)=A−S(t). Therefore, Equation (4) can be expressed as follows:

$$i(t) = \varsigma(2 \cdot S(t) - A) + n_a(t) + n_b(t) \quad (5)$$

Equation (5) represents the electrical current generated due to the reception of the modulated optical signal S(t) and the complementary modulated optical signal C(t). In comparison, if only the modulated optical signal S(t) were transmitted by the transmitter 202, the corresponding electrical current $i_s(t)$ generated by the receiver data processor 256 would be similar to that shown above in Equation (1). Assuming that the magnitudes of the noise signals are small compared to the magnitude of the optical signal S(t):

$$i(t) \approx 2 \cdot i_s(t) \quad (6)$$

That is, the electrical current i(t) generated corresponding to the receiver receiving both the modulated optical signal S(t) and the complementary modulated optical signal C(t) is approximately twice (i.e., about 3 dB greater than) the electrical current $i_s(t)$ generated corresponding to the receiver receiving the modulated optical signal S(t) alone.

In some implementations, the receiver data processor 256 can include additional circuitry such as trans-impedance amplifiers, demodulators, post-equalizers, analog to digital converters, error correction modules, etc., for processing the electrical current i(t) to generate the data.

In some implementations, the optical link 206 may introduce undesirable artifacts such as polarization mode dispersion (PMD) into optical signals traversing through the optical link 206. For example, birefringence of the material used for forming the optical link 106 may cause PMD in optical signals traversing the optical link 206. In some implementations, as a result of PMD, the polarization of the modulated optical signal S(t) may be undesirably rotated when traversing the optical link 206. Thus, at the receiver 204, the rotated polarization of the modulated optical signal S(t) may cause the PBS 252 to output a reduced power modulated optical signal S'(t). Similarly, the PBS 252 may also output a reduced power complementary modulated optical signal C'(t). The reduction in the power of the received modulated optical signals may, in turn, reduce the gain obtained at the receiver due to the transmission of the modulated optical signal S(t) and the complementary modulated optical signal C(t).

Generally, the modulated optical signal S(t) output by the optical modulator, such as the optical modulator 212 in FIG. 2, can be represented by Equation (7), as shown below:

$$S(t) = A \cdot \sin^2(f\{d(t)\}) \quad (7)$$

where A is a constant, d(t) denotes the electrical driving signal and f{ } represents the electrical transfer function of the optical modulator 212. In implementations where the optical modulator bandwidth is significantly greater than the electrical signal d(t) bandwidth, we have f{t}≈d(t).

As mentioned above, the modulated optical signal S(t) is polarized. Thus, the modulated optical signal S(t) can be expressed in terms of its X and Y polarization components $S_X(t,z)$, and $S_Y(t,z)$, respectively; where t represents time, and z represents distance traversed by the optical signal. Specifically, the X and Y polarization components $S_X(t,z)$, and $S_Y(t,z)$, respectively, at the output of the transmitter 202 (i.e., with z=0) can be expressed as follows:

$$S_X(t,0)=A\cdot\sin^2(f\{d(t)\}) \qquad (8)$$

$$S_Y(t,0)=A\cdot\cos^2(f\{d(t)\}) \qquad (9)$$

After traversing the optical link 206 of length L, the X and Y polarization components $S_X(t,z)$, and $S_Y(t,z)$, represented by $S_X(t,L)$, and $S_Y(t,L)$, can be expressed as shown below in Equations (10) and (11):

$$S_X(t,L)=\tau\cdot A\cdot\sin^2(f\{d(t)\}+\phi(t)) \qquad (10)$$

$$S_Y(t,L)=\tau\cdot A\cdot\cos^2(f\{d(t)\}+\phi(t)) \qquad (11)$$

where $\tau$ denotes a constant representing net effects of link losses over the optical link 206, and $\phi(t)$ denotes the effective polarization rotation angle. It is desirable that the polarization rotation angle $\phi(t)$ be minimized in the modulated optical signal received at the receiver 204.

Figure 3:
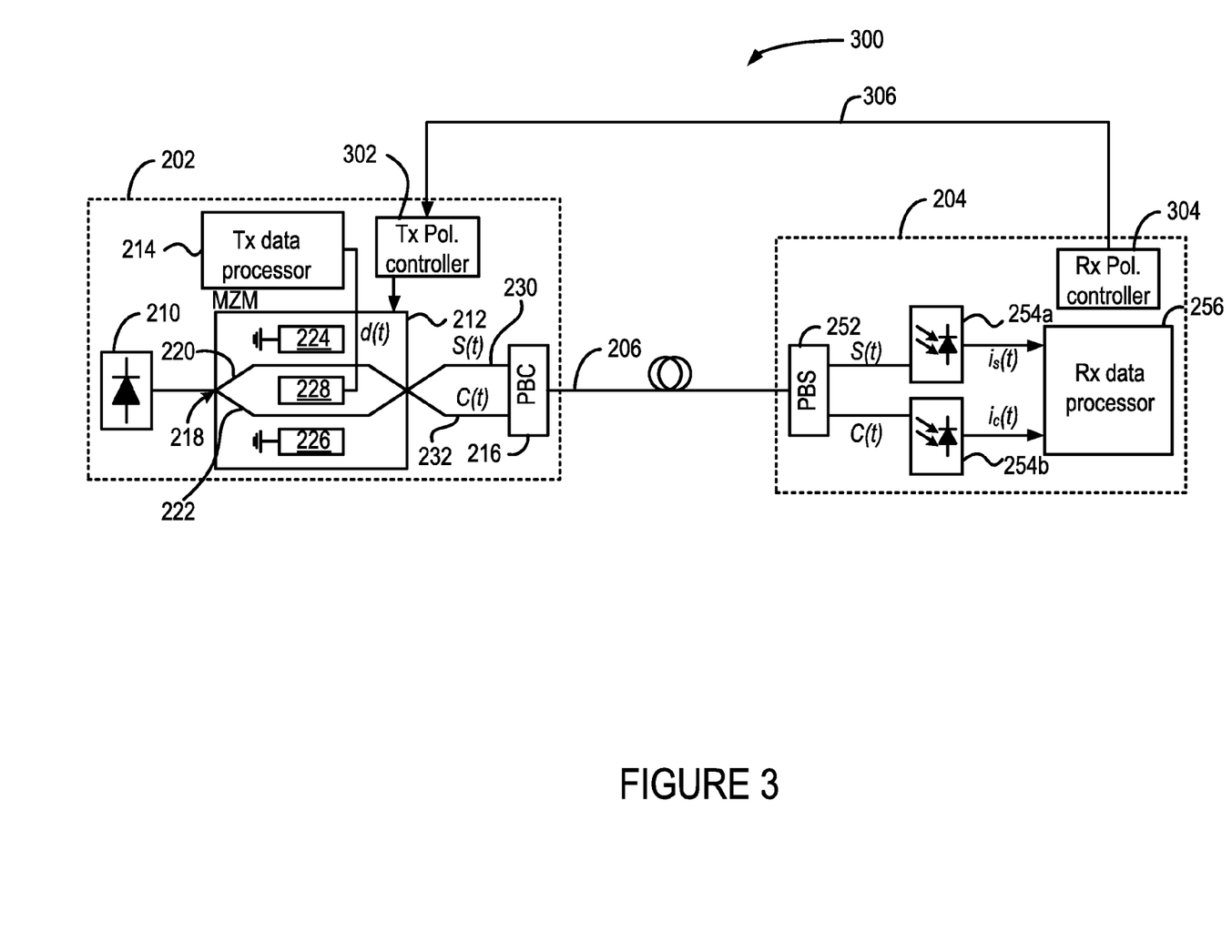
FIG. 3 shows a block diagram of an example communication system for mitigating the impact of signal artifacts introduced by a communication link.

FIG. 3 shows a block diagram of an example communication system 300 for mitigating the impact of signal artifacts introduced by the communication link 206. The communication system is similar to the communication system 200 shown in FIG. 2, however the communication system 300 further includes polarization rotation mitigation subsystems. In particular, the transmitter 202 includes a transmitter polarization controller (operating in the electrical domain) 302 and the receiver 204 includes a receiver polarization controller 304. In addition, in some implementations, the receiver polarization controller (operating in the electrical domain) 304 can communicate with the transmitter polarization controller 302 over a communication link 306. In some implementations, the communication link 306 can be an in-band communication link, such as the communication link 206, while in some other implementations, the communication link 306 can be an out-of-band communication link, such as a management channel or link.

In some implementations, the transmitter polarization controller 302 can receive a value for the polarization rotation angle $\phi(t)$ from the receiver polarization controller 304. The transmitter polarization controller 302 can utilize the received value of the polarization rotation angle $\phi$ (t) to modify the modulated optical signal S(t) to compensate for the rotation in polarization angle caused by the communication link 206. For example, in some implementations, the transmitter polarization controller 302 can cause a rotation the polarization angle of the modulated optical signal by the received value of $\phi(t)$ but in the opposite direction. This can be implemented at the transmitter by pre-distorting the electrical driving signal d(t) of the optical modulator 212. For example, if $f\{t\}\approx d(t)$, then the pre-distorted electrical driving signal can be given by $d(t)-\phi(t)$. Specifically, the transmitter polarization controller 302 will calculate and decide how to pre-distort the electrical driving signal such that the X and Y polarization components $S_X(t,z)$, and $S_Y(t,z)$, respectively, of the modulated optical signal S(t) can be modified as shown below:

$$S_X(t,0)=A\cdot\sin^2(f\{d(t)\}-\phi(t)) \qquad (12)$$

$$S_Y(t,0)=A\cdot\cos^2(f\{d(t)\}-\phi(t)) \qquad (13)$$

When the modulated optical signal S(t), with compensated polarization rotation angles as represented by Equations (12) and (13), is transmitted over the optical transmission link 206 of length L, the X and Y polarization components $S_X(t,z)$, and $S_Y(t,z)$, represented by $S_X(t,L)$, and $S_Y(t,L)$, can be expressed as shown below in Equations (14) and (15):

$$S_X(t,L)=\tau\cdot A\cdot\sin^2(f\{d(t)\}-\phi(t)+\phi(t)) \qquad (14)$$

$$S_Y(t,L)=\tau\cdot A\cdot\cos^2(f\{d(t)\}-\phi(t)+\phi(t)) \qquad (15)$$

The polarization rotation angle compensation of $\phi(t)$ cancels the polarization angle rotation $\phi(t)$ caused by the optical transmission link 206. As a result, the X and Y polarization components $S_X(t,L)$, and $S_Y(t,L)$ of the modulated optical signal S(t) at the receiver 204 are substantially free of polarization angle rotation.

As discussed above, the polarization rotation compensation is carried out at the transmitter 202 in the electrical as opposed to in the optical domain. Such a transmitter-side electrical polarization compensation method alleviates the need for the use of bulky and expensive optical equipment utilized in optical polarization rotation compensation and de-multiplexing techniques. Furthermore, implementing the electrical polarization rotation compensation at the transmitter 202, as opposed to at the receiver 204, alleviates the need for utilizing two power-hungry analog-to-digital converters (ADCs) to digitize the originally-modulated optical signal and the complementary signal at each polarization that would be required if the polarization rotation compensation were to be implemented at the receiver only. Instead, only one ADC is required at each polarization and a common balanced photodetector pair can be utilized to detect the power difference between the original signal S(t) and its complementary signal C(t). Thus implementing electrical domain polarization rotation compensation at the transmitter 202 can not only substantially reduce power consumption but also help reduce the cost over optical polarization rotation compensation techniques or electrical domain polarization compensation techniques implemented at the receiver 204.

As compared to polarization-division-multiplexing (PDM) systems in which the X- and Y-polarizations carry independent data, in the communication systems 200 and 300 shown in FIGS. 2 and 3 the X- and Y-polarizations communicate complementary-modulated signals. Communicating complementary-modulating signals can greatly simplify transmitter and receiver architectures. For example, independent-data PDM systems would require two MZM based modulators at the transmitter to generate two PDM optical data streams while each of the communication systems 200 and 300 only need one MZM to generate the two optical data streams. Further, at the receiver, independent-data PDM systems typically utilizes an additional narrow-linewidth laser (local oscillator), a complex 2×8 polarization and phase-diverse coherent mixer, four pairs of balanced photodetectors, four high-speed ADCs as well as sophisticated DSP algorithms to perform polarization demultiplexing. On the other hand, communication systems 200 and 300 each only include a single passive PBS, two balanced photodetetors (one for each polarization), two ADCs and much simpler DSP algorithms to perform polarization de-multiplexing.

In some implementations, the receiver polarization controller can determine the value of the polarization rotation angle $\phi(t)$ of the received optical signals, and transmit the value to the transmitter polarization controller 302. In some implementations, the receiver polarization controller 304 can instruct the transmitter polarization controller to transmit a prescribed test data or training symbols. The receiver polarization controller 304 can receive the modulated optical signal S(t) and the complementary modulated optical signal C(t) corresponding to the test data or training symbols and determine the value of polarization rotation angle $\phi(t)$. In some implementations, the receiver polarization controller 304 can determine the value of the polarization rotation angle φ(t) from the data normally transmitted by the transmitter 202 instead of from the test data or training symbols. As an example, if the transmitter 202 sends a sequence of data '1' with a high extinction ratio, then if there is no polarization rotation, the received power in the X-polarization Sx (i.e. the modulated optical signal) will be much higher than that in Y-polarization (i.e. the complementary signal). When a polarization rotation is introduced the received $S_X$ will reduce while the received $S_Y$ will increase, then the polarization angle can be deduced from the relative power variation between the received $S_X$ and $S_Y$. For using such a transmitter-side based polarization rotation compensation method, the polarization rotation effects can be detected by using a balanced photodetector (to detect $S_X$-$S_Y$) and the receiver only needs to process a single electrical signal which alleviates the use of two power-hungry analog-to-digital converters at the receiver 204.

In some implementations, the polarization rotation angle compensation techniques described above in relation to the modulated optical signal S(t) can be applied to compensate polarization angle rotation in the complementary modulated optical signal C(t).

In some implementations, for example when the length of the optical communication link 206 is long (i.e., greater than a few kilometers), the polarization rotation angle compensation can be carried out at the optical receiver 204. For example, in some implementations, the optical receiver 204 can include a feedback-controlled optical polarization controller positioned between the optical communication link 206 and the PBS 252 for detecting and adjusting the polarization rotations of the modulated optical signal and the complementary modulated optical signal. In some implementations, the polarization rotation compensation can be carried out by individually detecting and joint-processing the modulated optical signal and the complementary modulated optical signal in electrical domain. In some implementations, this approach may require the use of two analog-to-digital converters (ADCs) to digitize the received signal in both X and Y-polarizations which are then joint processed in a receiver signal processor. As a comparison, the previous described transmitter-side based polarization compensation method only needs one ADC to digitize the received (Sx-Sy) signal.

As mentioned above, transmitting the modulated optical signal and the complementary modulated optical signal can reduce or overcome undesirable effects of MPI. The following discussion shows the reduction in the impact of MPI by comparing the electrical signals generated by the receiver data processor 256 when no complementary modulated optical signal is received to the electrical signals generated by the receiver data processor 256 when both the modulated optical signal and the complementary optical signals are received.

For example, in some implementations, the current i(t) generated by the receiver data processor 256 when only the modulated optical signal S(t) is received can be expressed as follows:

$$i(t) \cong \varsigma \cdot S(t) + 2 \cdot \varsigma \cdot \sqrt{S(t) \cdot P_m(t)} \cdot \cos(\nu(t)) \quad (16)$$

where $P_m(t)$ denotes the optical power of an MPI signal that interferes with the modulated optical signal S(t) and ν(t) denotes the relative phase between the MPI signal and the modulated optical signal S(t). However, when the receiver receives both the modulated optical signal S(t) and the complementary modulated optical signal C(t), the electrical signal i(t) generated by the receiver data processor 256 can be expressed as follows:

$$i(t) \cong \varsigma(2S(t)-A)+2\varsigma\sqrt{S(t)P_{m1}(t)}\cos(\nu_1(t))-2\varsigma\sqrt{S(t)P_{m2}(t)}\cos(\nu_2(t)) \quad (17)$$

where $P_{m1}(t)$ and $P_{m2}(t)$ denote the optical power of the MPI signals that interfere with the modulated optical signal S(t) and the complementary modulated optical signal C(t), respectively; $v_1(t)$ denotes the relative phase between the modulated optical signal S(t) and its corresponding interfering MPI signal and $v_2(t)$ denote the relative phase between the complementary modulated optical signal C(t) and its corresponding interfering MPI signal. In some implementations, where the modulated optical signal S(t) and the complementary modulated optical signals C(t) are transmitted separately over different optical fibers, $v_1(t)$ and $v_2(t)$ may be statistically substantially independent. In some such implementations, this may reduce the noise power introduced by MPI by about 3 dB—resulting in an improvement in the SNR at the receiver by about 3 dB. In some implementations, where the modulated optical signal S(t) and the complementary modulated optical signal C(t) are transmitted over the same optical fiber, the improvement in SNR may be marginally less than 3 dB because relative phase between $P_{m1}(t)$ and $P_{m2}(t)$ can be correlated.

Figure 4:
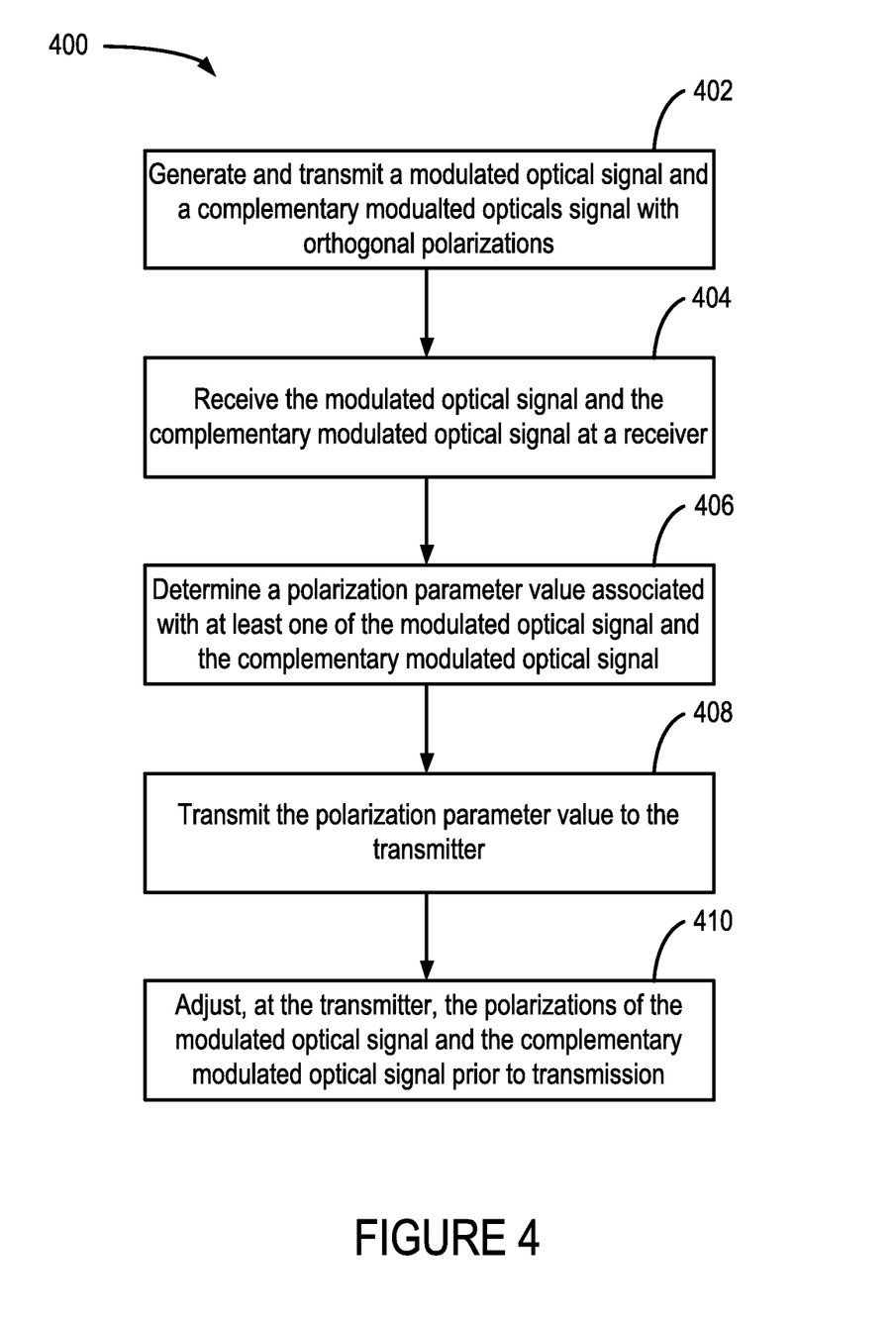
FIG. 4 shows a flow diagram of an example process for communicating data over a communication system.

FIG. 4 shows a flow diagram of an example process 400 for communicating data over a communication system. In some implementations, the process 400 may be executed by the optical receivers 202 and the optical transmitters 204 of the communication systems 200 and 300 shown in FIGS. 2 and 3. The process includes generating and transmitting a modulated optical signal and a complementary modulated optical signal with orthogonal polarizations (stage 402), receiving, at the receiver, the modulated optical signal and the complementary modulated optical signal (stage 404), determining a polarization parameter value associated with at least one of the modulated optical signal and the complementary modulated optical receiver (stage 406), transmitting the polarization parameter value to the transmitter (stage 408), and adjusting, at the transmitter, the polarizations of the modulated optical signal and the complementary modulated optical signal prior to transmission (stage 410).

The process 400 includes generating and transmitting a modulated optical signal and a complementary modulated optical signal with orthogonal polarizations (stage 402). Examples of this process stage have been discussed above in relation to FIGS. 2 and 3. For example, in optical transmitter 202 utilizes an electro-optic modulator, such as an MZM, to generate a modulated optical signal S(t) and a complementary modulated optical signal C(t). The modulated optical signal S(t) and the complementary modulated optical signal C(t) are polarized such that the polarization of the optical signal S(t) is orthogonal to that of the complementary modulated optical signal C(t). The modulated optical signal S(t) and the complementary modulated optical signal C(t) can be combined by the PBC 216 and transmitted to the optical receiver 204 over the optical communication link 206.

The process 400 also includes receiving, at the receiver, the modulated optical signal and the complementary modulated optical signal (stage 404). Examples of this process stage have been discussed above in relation to FIGS. 2 and 3. For example, the receiver 204 coupled to the optical communication link 206 receives the modulated optical signal S(t) and the complementary modulated optical signal C(t). The PBS 252 splits and provides the modulated optical signal S(t) and the complementary modulated optical signal C(t) to the balanced photodetectors 254a and 254b. The balanced photodetectors 254a and 254b generate electrical signals corresponding to the received optical signals. The receiver data processor processes the electrical signals generated by the photodetectors 254a and 254b to generate data.

The process 400 further includes determining a polarization parameter value associated with at least one of the modulated optical signal and the complementary modulated optical receiver (stage 406). One example of this process stage has been discussed above in relation to FIG. 3. For example, the receiver polarization controller 304 can determine the value of the polarization rotation angle of the received optical signals. In some implementations, the receiver polarization controller 304 can instruct the transmitter 202 to transmit test data or training symbols, and determine the value of the polarization rotation angle from the received optical signals corresponding to the test data or training symbols. In some implementations, the receiver polarization controller 304 can determine the value of the polarization rotation angle from the received optical signals corresponding to data that is normally transmitted by the transmitter 202.

The process 400 further includes transmitting the polarization parameter value to the transmitter (stage 408). One example of this process stage has been discussed above in relation to FIG. 3. For example, in some implementations, the receiver polarization controller 304 can transmit the value of the polarization rotation angle over the transmission link 306. The transmission link 306 can include in-band and out-of-band transmission links.

The process 400 also includes adjusting, at the transmitter, the polarizations of the modulated optical signal and the complementary modulated optical signal prior to transmission (stage 410). One example of this process stage has been discussed above in relation to FIG. 3. For example, the transmitter polarization controller 302 can use the received value of the polarization rotation angle to compensate for the rotation in polarization caused by the optical transmission link 206. Specifically, the transmitter polarization controller can cause a rotation the polarization angle of the modulated optical signal S(t) and the complementary modulated optical signal C(t) by the received value of polarization rotation angle $\phi(t)$ but in the opposite direction, as described by Equations (12) and (13). The compensation introduced by the transmitter polarization controller can mitigate polarization rotation caused by the optical transmission link 206.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An optical communication system comprising:
an optical transmitter communicably coupled to an optical link, including:
an optical signal generator configured to generate an optical signal;
an electro-optic modulator, having an input port coupled to the optical signal generator, a first output port, and a second output port, the electro-optic modulator configured to modulate the optical signal with an electrical data signal representative of data to be transmitted and generate a modulated optical signal at the first output port and a complementary modulated optical signal at the second output port;
at least one polarizer for polarizing the modulated optical signal and the complementary modulated optical signal, the modulated optical signal having a polarization that is orthogonal in relation to the polarization of the complementary modulated optical signal; and
a polarized beam combiner configured to combine the polarized modulated optical signal and the polarized complementary modulated optical signal into a combined optical signal with the modulated optical signal and the complementary modulated optical signal being carried in two orthogonal polarizations for transmission over the optical link; and
an optical receiver communicably coupled to the optical link, including:
a beam splitter communicably coupled to the optical link configured to split the received combined optical signal into a received modulated optical signal and a received complementary modulated optical signal;
a pair of photodetectors configured to generate a first electrical signal and a second electrical signal in response to receiving the received modulated optical signal and the received complementary modulated optical signal; and
circuitry configured to process the first electrical signal and the second electrical signal to generate a received data signal,
wherein the optical receiver further includes a receiver polarization controller configured to determine a value of a polarization parameter of at least one of the received modulated optical signal and the received complementary modulated optical signal, and to transmit the value of the polarization parameter to the transmitter; and
wherein the transmitter further includes a transmitter polarization controller coupled to the electro-optic modulator configured to receive the value of the polarization parameter and alter the electrical data signal based on the received value of the polarization parameter.

2. The system of claim 1, wherein the optical receiver is further configured to transmit the value of the polarization parameter to the transmitter over an out-of-band communication link or an in-band management channel.

3. The system of claim 1, wherein the electro-optic modulator includes a Mach-Zehnder modulator.

4. The system of claim 1, wherein the polarization parameter includes a polarization rotation angle.

5. A method for communicating data over communication system including an optical transmitter and an optical receiver communicating over a communication link, comprising:
generating an optical signal;
receiving an electrical data signal representative of data to be transmitted by the transmitter;
modulating the optical signal with the electrical data signal using an electro-optic modulator to generate a modulated optical signal and a complementary modulated optical signal;
polarizing the modulated optical signal and the complementary modulated optical signal, the modulated optical signal having a polarization that is orthogonal to the polarization of the complementary modulated signal,
transmitting the modulated optical signal and the complementary optical signal to the receiver over the optical link over two orthogonal polarization states;
converting, at the receiver, the received modulated optical signal and the received complementary optical signal into a first electrical signal and a second electrical signal, respectively;

processing the first electrical signals and the second electrical signal to generate data, determining, at the receiver, a polarization parameter value associated with at least one of the received modulated optical signal and the received complementary modulated optical signal;

transmitting the polarization parameter value to the transmitter; and adjusting, at the transmitter, the electrical data signal based on the polarization parameter value.

6. The method of claim 5, modulating the optical signal with the electrical data signal using an electro-optic modulator to generate a modulated optical signal and a complementary modulated optical signal includes utilizing a Mach-Zehnder modulator to generate the modulated optical signal and the complementary modulated optical signal.

7. The method of claim 5, wherein determining, at the receiver, a polarization parameter value associated with at least one of the received modulated optical signal and the received complementary modulated optical signal includes determining a polarization rotation angle.

8. The method of claim 5, wherein transmitting the polarization parameter value to the transmitter includes transmitting the polarization parameter value to the transmitter over an out-of-band communication link or an in-band management channel.

* * * * *